April 15, 1958     R. M. HIGGINS ET AL     2,830,541
FLUID BEARING FOR A TUBULAR ROTATING SHAFT
Filed June 1, 1954

Inventors
Richard M. Higgins
Edward F. Brill
by Steve W. Grewlaw
Attorney

United States Patent Office 2,830,541
Patented Apr. 15, 1958

2,830,541

FLUID BEARING FOR A TUBULAR ROTATING SHAFT

Richard M. Higgins and Edward F. Brill, West Allis, Wis., assignors to Allis-Chalmers Manufacturing Company, Milwaukee, Wis.

Application June 1, 1954, Serial No. 433,680

3 Claims. (Cl. 103—87)

This invention relates generally to a bearing support for a shaft and more specifically to a fluid pressure bearing for a tubular rotating shaft in which the shaft is supported by fluid pressure so that it is maintained coaxial to a stationary member interposed within the shaft.

Heretofore, rotating shafts have been supported by fluid pressure bearings disposed about the outer periphery of the shaft. The fluid pressure bearing structure of the prior art, into which the shaft is journaled, had to be relatively large and complicated to accommodate the shaft and to provide fluid bearing pockets surrounding the shaft and means for supplying fluid to the bearing pockets. Furthermore, the fluid bearing support structure is mounted in a suitable housing which must of necessity be large to accommodate the bearing support and its ancillary parts. Where the prior art fluid pressure bearing is applied to a fluid pumping machine, a stuffing box or suitable seal means are needed to prevent fluid leakage along the shaft. Applicant's invention resides in an improved fluid pressure bearing in which a stationary bearing support member is located within a tubular rotating shaft and the fluid pressure is exerted against the inner surface of the shaft to maintain the shaft coaxial with the stationary bearing member.

It is therefore an object of the present invention to provide an improved fluid pressure bearing for a machine such as a pump in which the aforementioned disadvantages of the fluid pressure bearing journaling a shaft are obviated.

Another object of the invention is to provide an improved fluid pressure bearing for a machine that is easier to manufacture and more economical than prior known fluid pressure bearings.

Another object of the invention is to provide an improved fluid pressure bearing for a machine that is more simplified in design and more compact requiring fewer parts and less space than prior known fluid pressure bearings.

Another object of the invention is to provide an improved fluid pressure bearing for a pump that eliminates providing suitable seal means to prevent fluid leakage therefrom.

Objects and advantages other than those set forth above will be apparent from the following description when read in connection with the accompanying drawings, in which.

Figure 1:
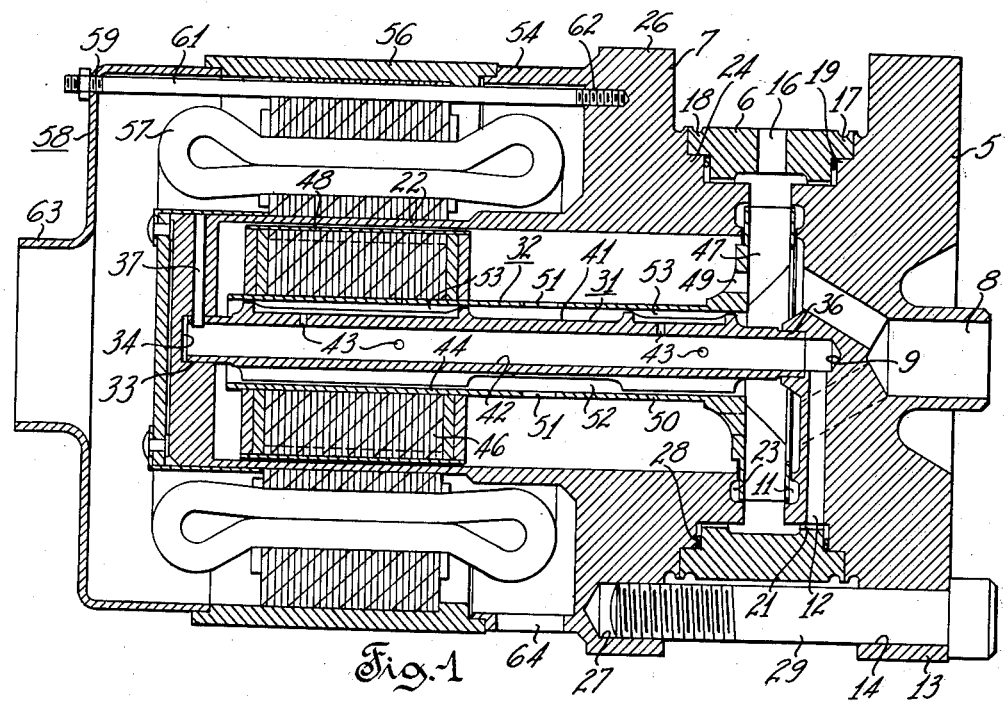
Fig. 1 is a section through a centrifugal pump embodying the invention.

As shown in the drawing, this invention is illustrated as applied to a motor-centrifugal pump combination having a housing. Starting from the suction end shown in Fig. 1 at the right of the drawing, the housing of the motor-pump comprises a plurality of parts 5, 6 and 7 fitted together generally in axial register to facilitate assembling and disassembling the motor-pump. The housing part 5 is shown as a circular disk defining a liquid suction inlet 8 on one side and an opening 9 centrally diposed therein in axial alignment with the suction inlet 8 on the opposite side. The part 5 further defines an annular groove 11 on the opposite side of the part 5 and a plurality of passageways 12 radially extending from the opening 9 to the periphery of the part 5 and being axially spaced from the one side of the part 5. The function of the foregoing recited parts will be explained later. The part 5 also has a peripheral flange 13 through which a plurality of bolt holes 14 are positioned, only one of which is shown. The housing part 6 adjacent the circular part 5 is shown as an annular disk defining a fluid outlet 16 and having annular peripheral flanges 17, 18 on the sides thereof. The annular flange 17 adjacent the part 5 mates with an annular shoulder portion 19 defined by the part 5 to provide an annular channel 21 between the part 5 and the part 6. The housing part 7 adjacent the annular part 6 defines a first shell 22 at one end, and an annular groove 23 on the opposite end thereof. The part 7 further defines a shoulder portion 24 that mates with the annular flange 18 of part 6, and an annular peripheral flange 26 presenting a plurality of threaded openings 27 therein, only one of which is shown, in register with the bolt holes 14 in the peripheral flange 13. Annular sealing rings 28, preferably metallic although any suitable type of sealing ring may be used, are interposed between the annular part 6 and the parts 5 and 7 of the housing. The parts 5, 6 and 7 of the housing are secured together by a plurality of bolts 29, only one of which is shown, passing through the bolt holes 14 in the flange 13 and engaging the threaded openings 27 in the flange 26. The portion of the annular flanges 17, 18 that engages the parts 5, 7, respectively, of the housing are welded along the outer periphery to provide a fluid tight housing.

The parts 5, 6 and 7 of the housing in the assembled position define a cavity including a pump casing for housing a stationary member 31 and a rotating member 32.

Figure 2:
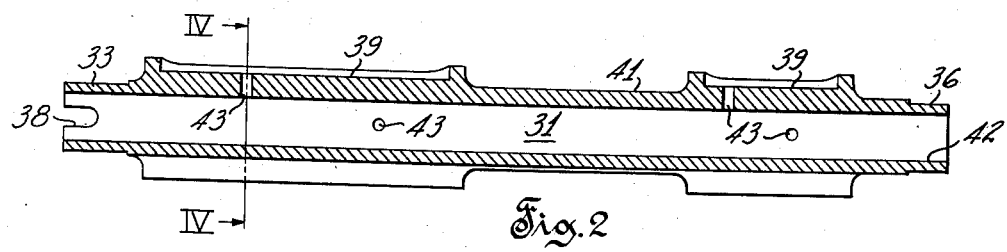
Fig. 2 is a section through a stationary bearing member of a fluid pressure bearing embodying the invention.
Figure 3:
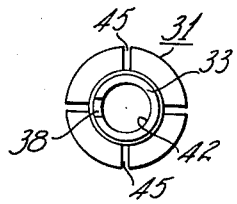
Fig. 3 is an end view of the stationary member shown in Fig. 2.
Figure 4:
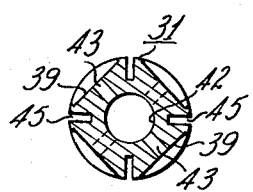
Fig. 4 is a section through the stationary member taken along line IV—IV of Fig. 2.

The stationary member 31 shown in Fig. 2 has one end portion 33 fitted into a suitable opening 34 positioned in the first shell 22 and the other end portion 36 fitted into the opening 9 of part 5 of the housing. The stationary member 31 is held in a fixed position by any suitable means shown as a pin 37 mounted in the first shell 22 and extending into a groove 38 in the end portion 33 of the stationary member 31. The stationary member 31 is shown as comprising a cylindrical portion of predetermined diameter, although the stationary member may have any possible symmetrical cross section such as square or triangular. The outer periphery of the stationary member 31 defines a plurality of axially spaced groups of bearing faces 39 circumferentially disposed about the member 31 although one group would be sufficient. The bearing faces 39 may be of any configuration, but preferably planar for easy machining. The portion 41 of the stationary member 31 axially interposed between the groups of bearing faces 39 has an outer diameter less than the predetermined diameter of the stationary member 31, although the outer diameter may be equal to the predetermined diameter of the member 31. The stationary member 31 further defines an axial bore 42 extending therethrough and an axially extending groove 45 circumferentially spaced between the bearing faces 39 and radially extending inward from the periphery of the member 31. Although only one groove 45 is shown between each face, a plurality of grooves may be used. A plurality of radially extending orifices 43, generally one to each face, are defined by the member 31 to interconnect the inner surface defining the axial bore 42 to the bearing faces 39. Although only one orifice 43 is shown interconnecting the inner surface of the bore 42 to each of the bearing faces 39, a plurality of such orifices may be used. The orifices 43 are staggered axially from one another to provide a more constant fluid pressure throughout the fluid pressure bearing.

The rotating member 32 comprises a rotatable tubular shaft 44, a rotor 46 and a pump impeller 47 surrounding the stationary member 31. The shaft 44 has an inner diameter greater than the predetermined diameter of the member 31 to provide clearance between the shaft 44 and the member 31. The electrical rotor 46 which may be any suitable type is mounted on one end of the shaft 44 and the centrifugal pump impeller 47 mounted by any suitable means on the other end. The rotor 46 is sealingly encased in a second shell 48 that is mounted on the shaft 44 by means such as welding to prevent any fluid contact with the rotor 46. The pump impeller 47 defines a plurality of circumferentially spaced openings 49 disposed in a pressure zone of a value substantially equal to the fluid inlet pressure of the pump. Means are provided for preventing axial movement of the rotating member 32, shown as the annual grooves 11, 23 of the housing parts 5, 7, respectively, although any other suitable means may be used. The grooves 11, 23 are positioned in a pressure zone of a value substantially equal to the discharge pressure of the pump. When the pump is operated, the grooves 11, 23 are filled with high pressure fluid from the pump casing which provides fluid pressure thrust bearings to prevent axial movement of the rotating member 32. A portion 50 of the shaft 44 axially interposed between the rotor 46 and the pump impeller 47 defines a plurality of openings 51 in register with the portion 41 of the stationary member 31. The rotating member 32 and the stationary member 31 cooperate to define a first chamber 52 and a plurality of second chambers 53, shown as pockets. The first chamber 52 comprises the annular space formed by the portion 41 of the stationary member 31 and the portion 50 of the tubular shaft 44, although the space need not be annular. The second chambers 53 comprise pockets formed by the faces 39 of the stationary member 31 and the tubular shaft 44.

The housing part 7 further defines an annular flange 54 radially spaced outward from the first shell 22. Adjacent the annular flange 54 is an annular ring 56 serving as a support for an electric field stator winding 57. The field stator winding 57 is so positioned that it is in radial register with the rotor 46. The annular ring 56 is held in position by an end bell member 58 which is located adjacent the annular ring 56. The bell member 58 is provided with a plurality of bolt openings 59 through which bolts 61, only one of which is shown, pass through and engage suitable threaded openings 62 in the housing part 7.

Suitable means such as a motor driven blower (not shown) may be connected to a flange 63 of the end bell 58 for cooling the stator windings 57. The air blown through the stator windings 57 passes out of the housing through suitable air outlets comprising radial openings 64 in the annular flange 7, only one of which is shown. Water cooling may be accomplished by having a stator winding comprising hollow copper stator conductors through which water may be passed.

In operation, the stator field winding 57 is connected to a suitable power source (not shown) whereby the rotating member 32 is rotated. The action of the impeller 47 draws fluid through the fluid suction inlet 8 and discharges the fluid through the discharge outlet 16. Some of the fluid at the impeller discharge is diverted partly into the annular grooves 11, 23 to prevent axial movement of the rotating member and partly through the annular channel 21 and passageway 12 into the axial bore 42 of the stationary member 31. This fluid passes through the orifices 43 in the stationary member 31 and into the second chambers 53 where the fluid pressure is considerably less than the discharge pressure of the fluid because of the pressure drop across the orifices 43.

When the rotating member 32 is at rest, the upper portion of the tubular shaft 44 is in metallic contact with the stationary member 31. Upon rotation of the rotating member 32, there is a rubbing metallic contact for the first few revolutions until the fluid pressure in the second chambers 53 builds up to the required operating pressure which is less than the discharge pressure of the pump impeller 47. The pressurized fluid causes the tubular shaft 44 to be positioned coaxially with the stationary member 31. Any movement of the tubular shaft 44 towards a second chamber 53 causes pressure to build up in that chamber 53 because of the increased restriction of flow and reduced pressure drop across the orifice 43 from the axial bore 42 to that second chamber 53. The pressure in the diametrically opposed second chamber 53 simultaneously decreases producing a restoring force tending to maintain the tubular shaft 44 coaxial to the stationary member 31. The fluid in the second chambers 53 gradually leaks into the first shell 22 partly by moving axially past the end of the groups of bearing faces of the tubular shaft 44, partly by moving through the first chamber 52 and openings 51 in the tubular shaft 44, and partly through the annular grooves 45. The fluid passes from the first shell 22 through the openings 49 in the pump impeller 47 into the pump casing.

Although but one embodiment has been illustrated and described it will be apparent to those skilled in the art that various changes and modifications may be made therein without departing from the spirit of the invention or from the scope of the appended claims.

It is claimed and desired to secure by Letters Patent:

1. A motor-pump combination for pumping fluids, said combination comprising: a housing defining a pump casing having a fluid inlet and a fluid outlet; a stationary member mounted in said housing, said member having a bore therein and further defining at least two bearing faces circumferentially spaced about the outer periphery of said member at equal intervals; a rotatable hollow shaft having an inner surface surrounding said member with a clearance therebetween, each of said faces and the inner surface of said shaft cooperating to define a chamber therebetween; said member further defining at least one hole radially extending from the surface defining said bore to each of said bearing faces to connect said bore to the chambers; an impeller positioned in said pump casing and mounted for rotation on one end of said shaft; means for maintaining said shaft in radial register with said member; means for rotating said shaft and said impeller to cause fluid to be drawn through said fluid inlet and discharged through said fluid outlet; means for directing a portion of the fluid from said fluid outlet into said bore of said member, said fluid passing through said holes into said chambers to maintain said shaft coaxial with said member upon rotation of said shaft; and means for returning said fluid from said chambers to said fluid inlet.

2. A motor-pump combination for pumping fluids, said combination comprising: a housing defining a pump casing at one end and a first shell at the other end, said pump casing having a fluid inlet and a fluid outlet; a stationary member having its end portions mounted in said housing, said member having an axial bore extending from one end thereof, said member comprising a cylindrical portion of predetermined diameter recessed to define a plurality of axially spaced groups of bearing faces circumferentially disposed about the outer periphery of said member, the part of said member portion axially interposed between said axially spaced groups of faces having an outer diameter less than said predetermined diameter, said member defining at least one axially extending groove circumferentially spaced between adjacent bearing faces and radially extending inward from the periphery of said member; a rotatable hollow shaft having an inner surface surrounding said member with a clearance therebetween; said part of said member and said inner surface of said shaft cooperating to define an annular first chamber therebetween; said faces and said shaft cooperating to define a plurality of second chambers therebetween, said member further defining a plurality of holes radially extending from the surface defining said bore to said bearing faces to connect said bore to said second chambers, said shaft further having at least one radial first opening in register with said part of said member to provide an outlet for fluid passing through said clearance from said second chambers into said first chambers; means mounted on said housing for preventing axial movement of said shaft; an impeller positioned in said pump casing and mounted for rotation on one end of said shaft, said impeller defining a plurality of circumferentially spaced second openings in a zone at a pressure below discharge pressure; a rotor mounted for rotation on the other end of said shaft; a second shell mounted on said shaft and encasing said rotor to prevent fluid from contacting said rotor; said shaft, said rotor and said impeller being hermetically encased in said housing; said pump casing defining a passageway connecting said fluid outlet to said bore of said member to divert some of the fluid being pumped into said member; a stator mounted on said housing, said stator positioned in register with said rotor and surrounding said first shell of said housing; said stator when electrically excited causing said shaft, said rotor and said impeller to rotate for drawing fluid through said inlet and discharging the fluid through said outlet, some of the fluid being pumped passing through said passageway, said bore and said holes into said second chambers to maintain said shaft coaxial with said member upon rotation of said shaft, said fluid from said second chamber passing partly through said first chamber and first opening, partly through said groove and partly around said second shell into said first shell to cool said rotor and said shaft, said fluid in said first shell returning to said pump casing through said second openings.

3. A motor-pump combination for pumping fluids, said combination comprising: a housing defining a pump casing at one end and a first shell at the other end, said pump casing having a fluid inlet and a fluid outlet; a stationary member having its end portions mounted in said housing, said member having an axial bore extending from one end thereof, said member comprising a cylindrical portion of predetermined diameter recessed to define a plurality of axially spaced axially extending groups of generally planar bearing faces circumferentially disposed about the outer periphery of said member, the part of said member portion axially interposed between said axially spaced groups of faces having an outer diameter less than said predetermined diameter, said member defining at least one axially extending groove circumferentially spaced between adjacent bearing faces and radially extending inward from the periphery of said member, a rotatable tubular shaft surrounding said member, said shaft having an inner diameter greater than said predetermined diameter of said member to provide clearance between said shaft and said member; said part of said member and said shaft cooperating to define an annular first chamber therebetween, said faces and said shaft cooperating to define a plurality of second chambers therebetween, said member further defining a plurality of holes radially extending from the surface defining said bore to said bearing faces to connect said bore to said second chambers, said shaft further having at least one radial first opening in register with said part of said member to provide an outlet for fluid passing through said clearance from said second chamber into said first chamber; means mounted on said housing for preventing axial movement of said shaft; an impeller positioned in said pump casing and mounted for rotation on one end of said shaft, said impeller defining at least one circumferentially spaced second opening in a zone at a pressure below discharge pressure; a rotor mounted for rotation on the other end of said shaft; a second shell mounted on said shaft and encasing said rotor to prevent fluid from contacting said rotor; said shaft, said rotor and said impeller being hermetically encased in said housing; said pump casing defining a radially extending passageway axially spaced from said impeller, said passageway connecting said fluid outlet to said bore of said member to divert some of the fluid being pumped into said member; a stator mounted on said housing, said stator positioned in register with said rotor and surrounding said first shell of said housing; said stator when electrically excited causing said shaft, said rotor and said impeller to rotate for drawing fluid through said inlet and discharging the fluid through said outlet, some of the fluid being pumped passing through said passageway, said bore and said holes into said second chambers to maintain said shaft coaxial with said member upon rotation of said shaft, said fluid from said second chamber passing partly through said first chamber and first opening, partly through said groove and partly around said second shell into said first shell to cool said rotor and said shaft, said fluid in said first shell returning to said pump casing through said second opening.

References Cited in the file of this patent

UNITED STATES PATENTS

| | | |
|---|---|---|
| 2,578,711 | Martellotti | Dec. 18, 1951 |
| 2,660,485 | Gerard | Oct. 24, 1953 |

FOREIGN PATENTS

| | | |
|---|---|---|
| 508,115 | Belgium | Jan. 15, 1952 |
| 633,286 | Great Britain | Dec. 12, 1949 |